United States Patent [19]

Thibodeau et al.

[11] Patent Number: 5,045,778

[45] Date of Patent: Sep. 3, 1991

[54] FAULT INDICATOR WITH INRUSH RESTRAINT

[75] Inventors: Joseph R. Thibodeau, Dedham; Matthew G. Dillon, Hingham, both of Mass.

[73] Assignee: Sigma Instruments, Inc., Weymouth, Mass.

[21] Appl. No.: 303,761

[22] Filed: Jan. 30, 1989

[51] Int. Cl.⁵ .............................................. H02H 3/08
[52] U.S. Cl. ..................................... 324/133; 361/96
[58] Field of Search ............... 307/272.3; 361/29, 28, 361/95, 96, 97; 340/654; 324/133

[56] References Cited

U.S. PATENT DOCUMENTS 3,956,670  5/1976  Shimp ................................ 361/95
3,959,704  5/1976  McRea ............................... 361/29
3,996,499  12/1976  Gary ................................. 361/29
4,002,948  1/1977  Gary ................................. 361/29
4,224,651  9/1980  Allen ................................ 361/28
4,246,622  1/1981  Hosoda ............................. 361/95
4,404,612  9/1983  Hughes ............................. 361/95
4,442,472  4/1984  Pang ................................. 361/95

*Primary Examiner*—Kenneth Wieder
*Assistant Examiner*—Jose M. Solis
*Attorney, Agent, or Firm*—Stanger, Michaelson, Spivak & Wallace

[57] ABSTRACT

An inrush restraint in a fault indicator disables trip in response to the current in the cable being monitored changing from reset to trip values within a predetermined period.

9 Claims, 7 Drawing Sheets

FIG. 2

| | PRIOR A | PRIOR B | A | B | $\overline{A+B}$ | PIN2 ON/$\overline{\text{OFF}}$ | ND2 | AD1 | ND4 | CT1 | ND1 | AD3 | Q2 | ND3 | AD2 | Q1 |
|---|---|---|---|---|---|---|---|---|---|---|---|---|---|---|---|---|
| 1 | | | H | H | L | L | L | L | H | | H | L | OFF | L | L | OFF |
| 2 | | | H | L | L | L | L | L | H | | H | L | OFF | H | L | OFF |
| 3 | | | L | H | L | H | H | H | L | | H | H | ON | L | L | OFF |
| 4 | | | L | L | H | X | H | L | H | | L | L | OFF | H | X | |
| 5 | L | H | L | L | | H | | | | | | | OFF | H | H | ON |
| 6 | H | H | L | L | | L | | | | | | L | OFF | | L | OFF |

FAULT INDICATOR WITH INRUSH RESTRAINT

BACKGROUND OF THE INVENTION

This invention relates to faulted circuit indicators, and particularly to faulted circuit indicators having inrush restraints.

The use of faulted circuit indicators (or FCIs or fault indicators) to decrease the time of locating faults, either temporary or permanent in nature, on utility distribution systems is not new to the industry.

Since the early 1970's, when the use of FCI's began on a large scale, they have evolved from a "simple" high current trip and low current reset indicating device to an instrument that senses current wave shapes, recognizes presence and/or magnitude of voltage, uses real time to modify its trip and reset functions, beats the clearing time of low current rated current limiting fuses under high fault current conditions, disregards energization inrush currents, and a host of other features. When other options, such as various mounting configurations, types of indicating displays, polyphase sensing, etc. are included, there are will over 1000 types and styles available!

Attempts to disregard energization inrush currents have generally had limited success because they required an extended outage for operation and often were unable to ignore long term inrushes.

OBJECTS AND SUMMARY OF THE INVENTION

An object of the invention is to overcome these difficulties.

Another object is to furnish a faulted circuit indicator which can restrain response to both short term inrushes as well as longer inrushes.

According to the invention, the faulted circuit indicator includes means for disabling the indicator's trip function in response to changes in current values within a predetermined period.

According to another feature, the predetermined period is selected on the basis of the nature of the current outage prior to the inrush.

These and other features of the invention are pointed out in the claims. Other objects and advantages of the invention will become evident from the following description when read in light of the accompanying drawings.

The invention is based on the recognition that inrush current is always greater than normal current for any value of connected load. It is comprised of two components, each of which must be considered when determining the trip operations of an FCI. One component can be called "energization inrush" and the other "cold-load inrush".

Energization inrush is the sum of the start-up currents required for charging the capacitive component of the cables, incandescent/fluorescent lamps, small appliance and large induction motors, distribution transformers, and all connected capacitor banks. The time required for the decay of this current towards normal is generally less than 15 cycles.

Cold-load inrush is the sum of the currents of loads that take time before they reach normal current (such as motor loads) and the lack of diversity of thermostatically controlled loads (such as ovens and space heaters). Motor starting loads usually decay to normal in a matter of seconds (less than three seconds for small motors; less than ten seconds for large motors). Thermostatically controlled loads usually reach diversity equilibrium within 60 minutes after periods of power outage lasting over four hours. The cold-load current magnitudes are usually less than six times normal current of the connected load at the time of energization, decreasing to two times normal current within five minutes.

BRIEF DESCRIPTION OF THE DRAWINGS

FIG. 2 is a truth table illustration the operation of the device in FIG. 1.

DETAILED DESCRIPTION OF PREFERRED EMBODIMENTS

Figure 1:
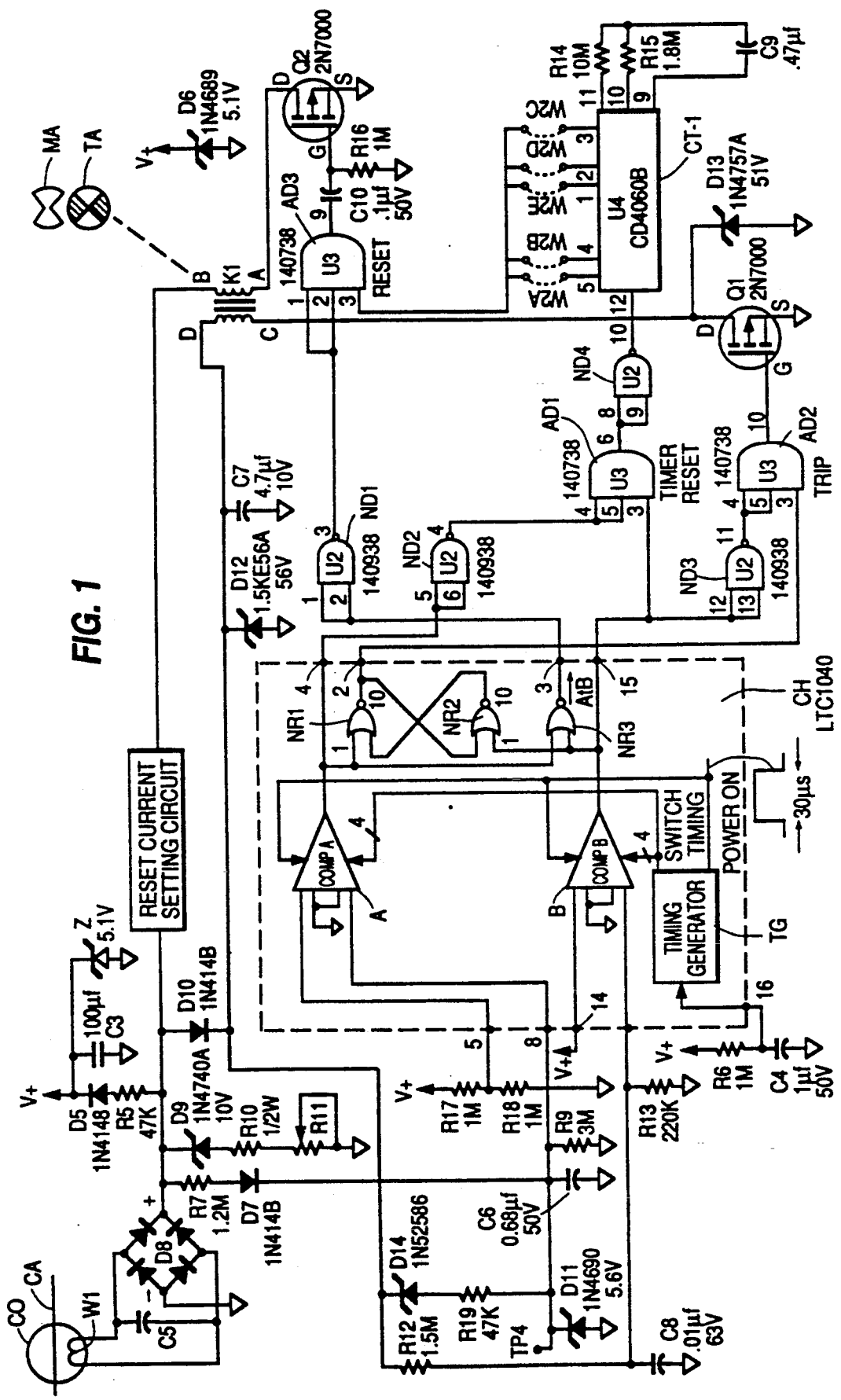
FIG. 1 is a schematic diagram of a faulted circuit indicator embodying features of the invention.

The fault indicator (or faulted circuit indicator, or FCI) of FIG. 1, responds to current of a cable CA in a distribution system. In FIG. 1, split core CO forms a current transformer with a winding W1 and surrounds the cable CA whose current is being sensed. The current transformer serves both to sense the current in the cable and as a source of power to operate the fault indicator. A diode bridge DB parallel to a shunting capacitor C5, rectifies the alternating voltage which the alternating current in the cable CA induces in the winding W1. A resistor R5 and a diode D5 charge a 100 microfarad capacitor C3 up to 5.1 volts determined by a 5.1 Zener diode D6. This arrangement establishes a 5.1 volt voltage V+ for energizing the logic components of the indicator.

A reset circuit RC sets a reset voltage which corresponds to a minimum current value in the cable CA. When the voltage across the bridge DB causes the voltage in the reset circuit RC to reach the reset voltage, current passes through a winding AB and an FET Q2 if the latter is on. The winding AB is part of a magnetically actuable display DP which rotates a disc or target TA relative to a mask MA. The target TA has four sectors divided into two different colors. Current from the circuit RC causes the winding AB to move the target TA into a reset position indicating no fault. Once an energized winding moves the target TA into a position, it maintains that position until a succeeding current in a winding CD turns the target TA into another position.

A current to energize the winding CD and drive the target in the other direction arrives from a trip circuit composed of a 4.7 microfarad capacitor C7 and a 5.6 volt Zener diode D12. The latter are connected to the diode bridge DB through a Zener diode D12 which is set to the 5.6 volt value corresponding to a desired trip current in cable CA. The trip setting circuit TC applies its current to the trip winding CD of the display DP and an FET Q1 if the latter is on. Such a current, turns the target TA to "fault", i.e. a position showing fault indicating colors behind the stationary mask MA. Reset current setting circuits and trip setting circuits are known and shown for example in U.S. Pat. No. 3,558,984.

The inrush restraint arrangement of the invention causes the FET's Q1 and Q2 to become nonconductive and thereby to prevent current flow through the windings AB and CD of the display DP, during current inrush. For purposes of inrush restraint an LTC1040 chip CH forms part of a logic circuit which receives an input from the bridge DB and enables or disables operation of the FET's Q1 and Q2. A timing generator TG in the chip CH allows the chip to operate periodically, namely by taking a 70 microsecond sample every 150 milliseconds. A capacitor C4 and resistor R6 establish the 150 millisecond repetition rate. The sampling arrangement has two desirable effects. The 150 millisecond period creates a measurement delay of approximately 10 cable current cycles before the chip produces a measurement sample. It also reduces the total time during which the chip needs to operate and hence saves considerable energy.

At the input to the chip CH, a resistor R7, a diode D7, a 0.068 microfarad capacitor C6, and 3M resistor R9 form a fast time constant branch in which the diode D7 and the capacitor C6 peak detect the voltage at the diode bridge DB. The voltage on C6 responds quickly to changes in input current and furnishes a reset control input. The voltage across the capacitor C6 appears at chip pin 8 at the input of a comparator A. Initially, if current has just started to flow in cable CA after an extended down time, nothing happens in this state until the voltage across the capacitor C3 reaches a sufficiently high value to provide power for the chip CH. When the voltage across capacitor C reaches 3 volts, the chip CH energizes comparator A for 70 microseconds every 150 milliseconds. The comparator A then compares the voltage across capacitor C6 with the voltage at a voltage divider R17, R18 that divides the voltage V+ into two.

If the voltage at pin 8 is high enough to represent a reset condition, it is higher than that of pin 5, and the comparator A goes low. This causes NAND gate ND2 to go high and provides a high input to AND gate AD1. The other input to AND gate AD1 comes from comparator B which is normally high prior to a trip condition. As a result, AND gate AD1 goes high. A NAND gate ND4 inverts the output of the AND gate AD1 and resets a timer CT1 so that the latter starts counting. The timing period is selected at the output of the timer CT1 by the utility that operates the cable CA. It may be one minute to two hours after resumption of power, when the timing period reaches the selected time, the selected output goes high and provides one of the highs required at the reset AND gate AD3.

The other high for producing a high output at the AND gate AD3 comes from a low at a pin 3 of the chip CH. The pin 3 produces a low when either of the inputs to a NOR gate NR3 goes high. In this case the high arrives from the output of the comparator B. This voltage at pin 3 will remain low until a trip current is reached. The two highs at the AND gate AD3 turn on the FET Q1 which allows current through the reset winding AB. The logic disables the reset if either input to the AND gate AD3 is low.

The trip portion of the device also receives its energy from the current sensor winding W1 and bridge DB. The bridge DB charges a 0.01 microfarad capacitor C8 through a resistor R12 and across a resistor R13. When the voltage at pin 11 across the resistor R13 exceeds the voltage V+ at pin 14, the comparator B goes low. The NAND gate ND3 inverts the low voltage and applies a high to the AND gate AD2. If the voltage at a pin 2 of the chip CH is high, the AND gate AD2 turns on an FET Q1 which allows current from the trip setting circuit to pass through the trip winding CD and turn the target TA to fault, i.e. to its fault indicating condition. If either input to the AND gate AD2 is low, the logic disables the trip operation.

The voltage at pin 2 represents an inrush latch voltage coming from a flip flop composed of NOR gates NR1 and NR2. That is, the pin 2 latches the faulted circuit indicator into the inrush restraint condition as long the detector has recognized the current as an inrush current and as long as the inrush current remains above the trip value.

As disclosed, when minimum reset conditions exist, comparator A goes low each time the generator GT energizes the chip CH. When current exists above the trip value comparator B goes low. When both A and B are low gate NR3, i.e. pin 3, goes high. This prevents reset during a trip condition.

Pin 2 goes high only when comparator A is low and comparator B is high. This relates to the condition when the fault indicator operates between the window of the minimum reset condition and its trip point. This output remains high when the comparator B goes low if the low at the output of comparator A has existed prior to this transition.

If on the other hand, both outputs go from high to low on the same sample cycle the pin 2 remains latched in the low state. This means that if current starts and reaches a value in excess of the trip value then the pin 2 will remain latched low until the current falls below the trip point. At that time the pin 2 goes high and remains in that condition as long as minimum reset current is available. Any further excursions above the trip point or after will go to trip immediately. The flip flop composed of NOR gates NR1 and NR2 has a truth table as shown in FIG. 2.

The invention will best be understood by considering the truth table in FIG. 2 as well as the diagrams in the other figures. When the current sensed by the winding W1 exceeds the desired reset current, the capacitor C6 applies a voltage to the comparator A which makes the comparator A go low. Similarly, when the winding W1 senses a current in the cable A in excess of the trip value, the capacitor C8 applies a voltage to the comparator B which makes the latter go low. The columns prior A and prior B serve to show a transition in which the current starts between the reset and trip values, such as normal operation, and a transition occurs to that shown in columns A and B to the trip state. That is, when the cable carries normal current above the reset condition the comparator A is low and the comparator B is high.

If the current exceeds the trip value, the comparator B goes from high to low. However, in that state the output of the flip flop composed of NOR gates NR1 and NR2 at the pin 2 remains high. This maintains a high at one input of the AND gate ND2. The low at the output of comparator B appears at the NAND gate 3 which inverts it and applies a high to the AND gate AD2. The latter then turns on the transistor Q1. Under those circumstances, the winding CD of the display DP turns the target TA to a fault condition.

Figure 3:
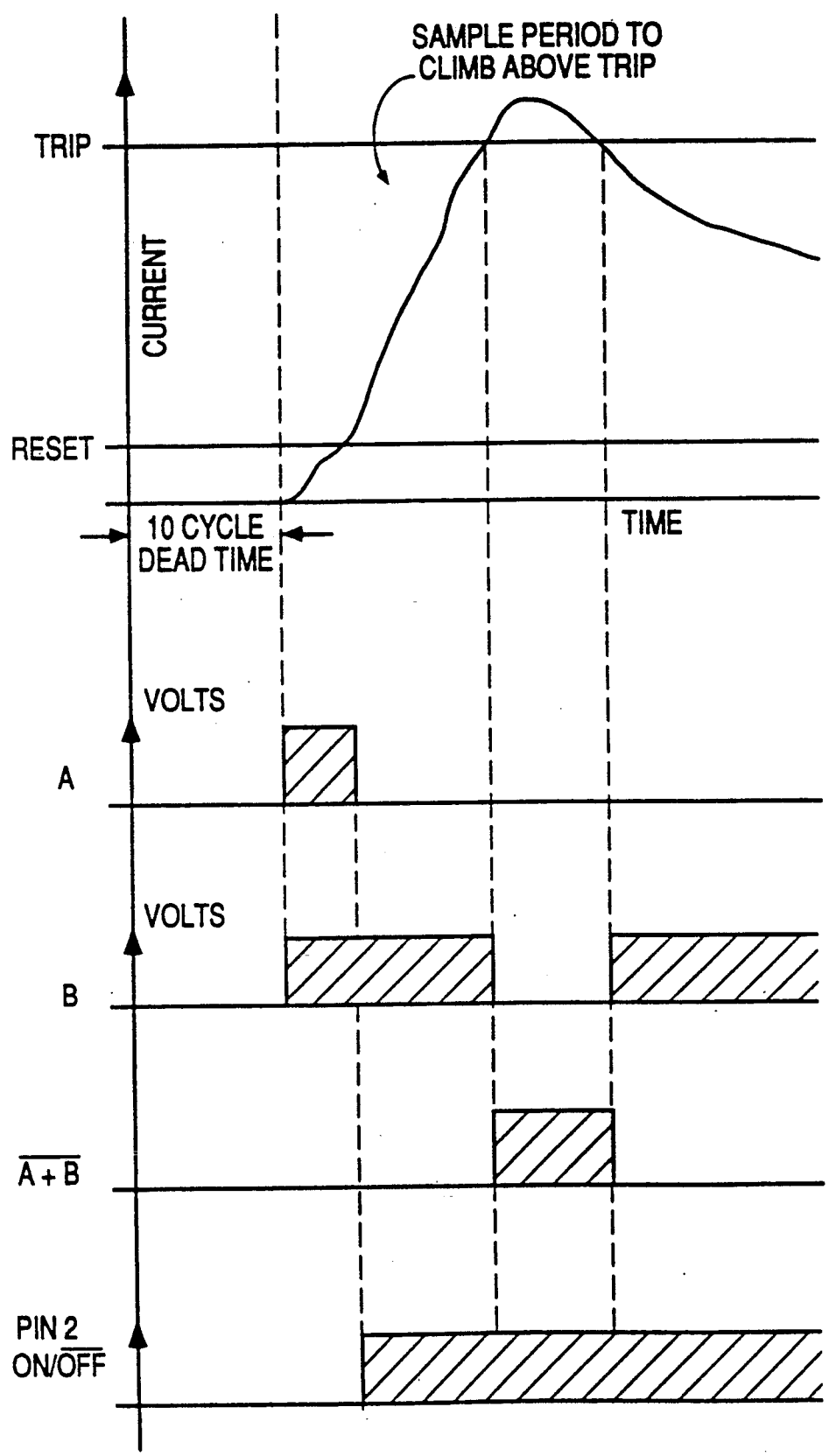
FIG. 3 is a graph illustrating the operation of the device in FIG. 1.

Without inrush, the current rises slowly as shown in FIG. 3. The voltage inputs to the comparators A and B and pins 8 and 11 are then both lower than the reference values at pins 5 and 14. Comparators A and B are then each high. As shown by the truth table of FIG. 2, the output $\overline{A} + \overline{B}$ is low, on/off is low, NAND gate ND2 is low, AND gate AD1 is low, NAND gate ND4 is high, so that the counter is turned off. The AND gate AD3 is thus low and transistor Q2 is off. Similarly, the NAND gate ND3 is low as is the AND gate AD2. Thus, FET Q1 is off. When the current rises to a value between the reset and trip value, comparator A goes low and B remains high. This sets pin 2, and AD1 high. Accordingly, gate ND4 goes low and turns on the counter CT1.

After a time, its output goes high to turn gate AD3 high. This turns on the FET Q2 As normal operation continues and current exceeds the trip value, the comparator B experiences a transition from high to low. This transition is shown in the line 5 of the truth table in FIG. 2. Here pin 2 remains high. Otherwise, the conditions of line 4 prevail. That is, gates ND2, ND4, and ND3 go high while gates AD1, ND1, and AD3 go low. Consequently, FET Q2 turns off and FET Q1 turns on. This turns the target to the trip position.

When the current falls below a trip value, comparator A remains low while comparator B goes high. The condition shown in line 3 of the truth table prevails and transistor Q2 and Q1 are on and off.

Figure 4:
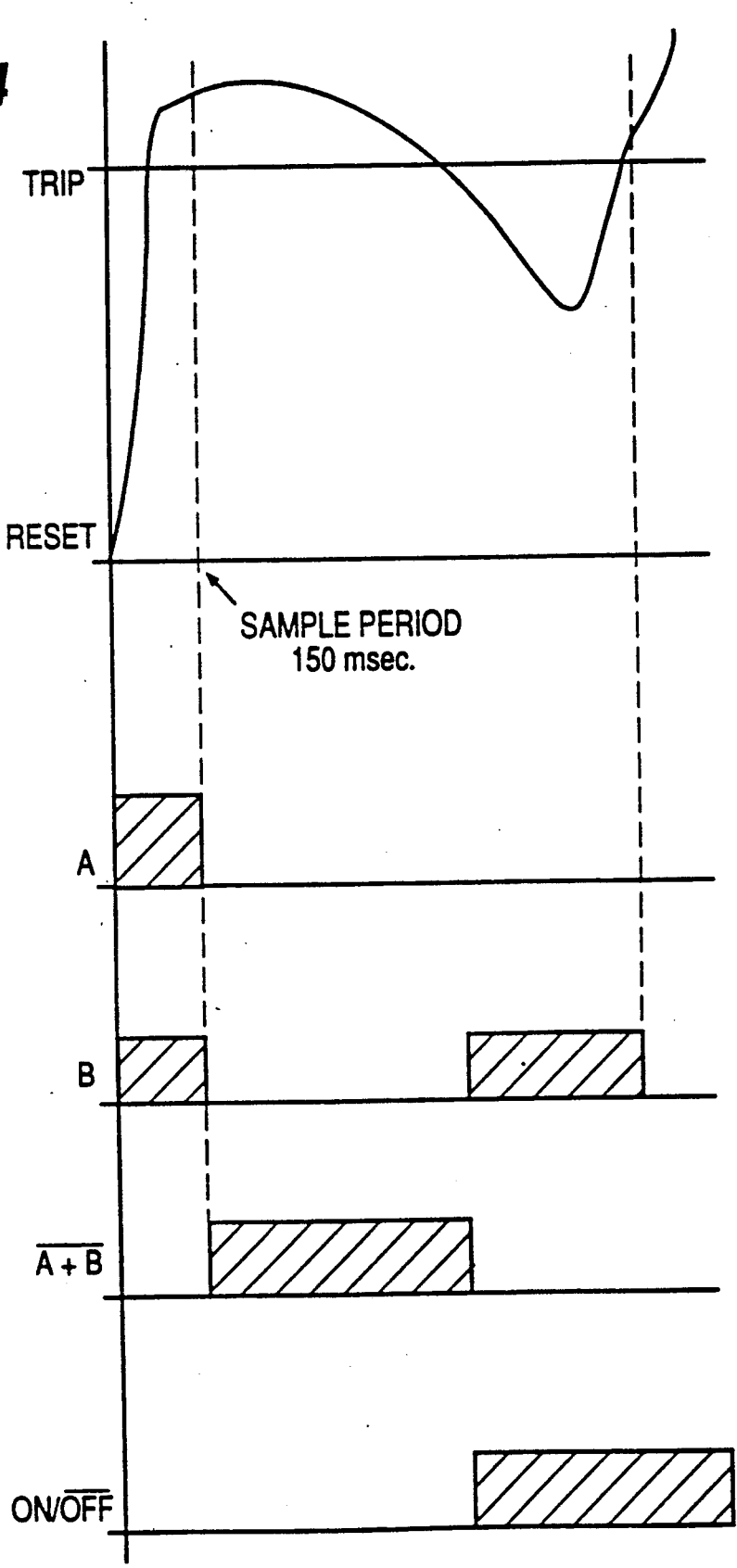
FIG. 4 is a graph illustrating the operation of the device in FIG. 1.

FIG. 4 illustrates the effect of a current inrush. Here, within a single sampled period of 150 milliseconds the current passes through the reset and trip values. In the condition when the comparators A and B were both high, the pin 2 exhibited a low. This low continues as the comparators A and B go low. Accordingly, both gates AD2 and AD3 go low and turn off FET's Q1 and Q2 thereby disabling both the trip and reset function of the display and maintaining the display DP in its prior reset condition. When the current falls below the trip value, comparator B goes high and comparator A remains low. As shown in line 3 of the truth table, FET Q2 goes on and FET Q1 stays off. The reset condition of the display DP remains. When the current again exceeds a trip value, comparator A goes low as shown in line 4 of the truth table. This transition from line 3 to line 4 causes pin 2 to maintain its high condition as shown in line 5, thereby turning off FET Q2 and turning on FET Q1. This allows current through the winding DC and turns the target TA to a fault position.

The inrush restraint has two different modes of activation. In mode 1, the cable CA has a history of zero current flow for at least 90 seconds just prior to being energized. This is an extended outage. In mode 2 the cable CA is experiencing a cycling action of zero to greater than 1 ampere due to opening of a reclosure sequence in the distribution system. That is the system breaker which responds to a fault tries to reclose several times. This produces inrush.

Figure 5:
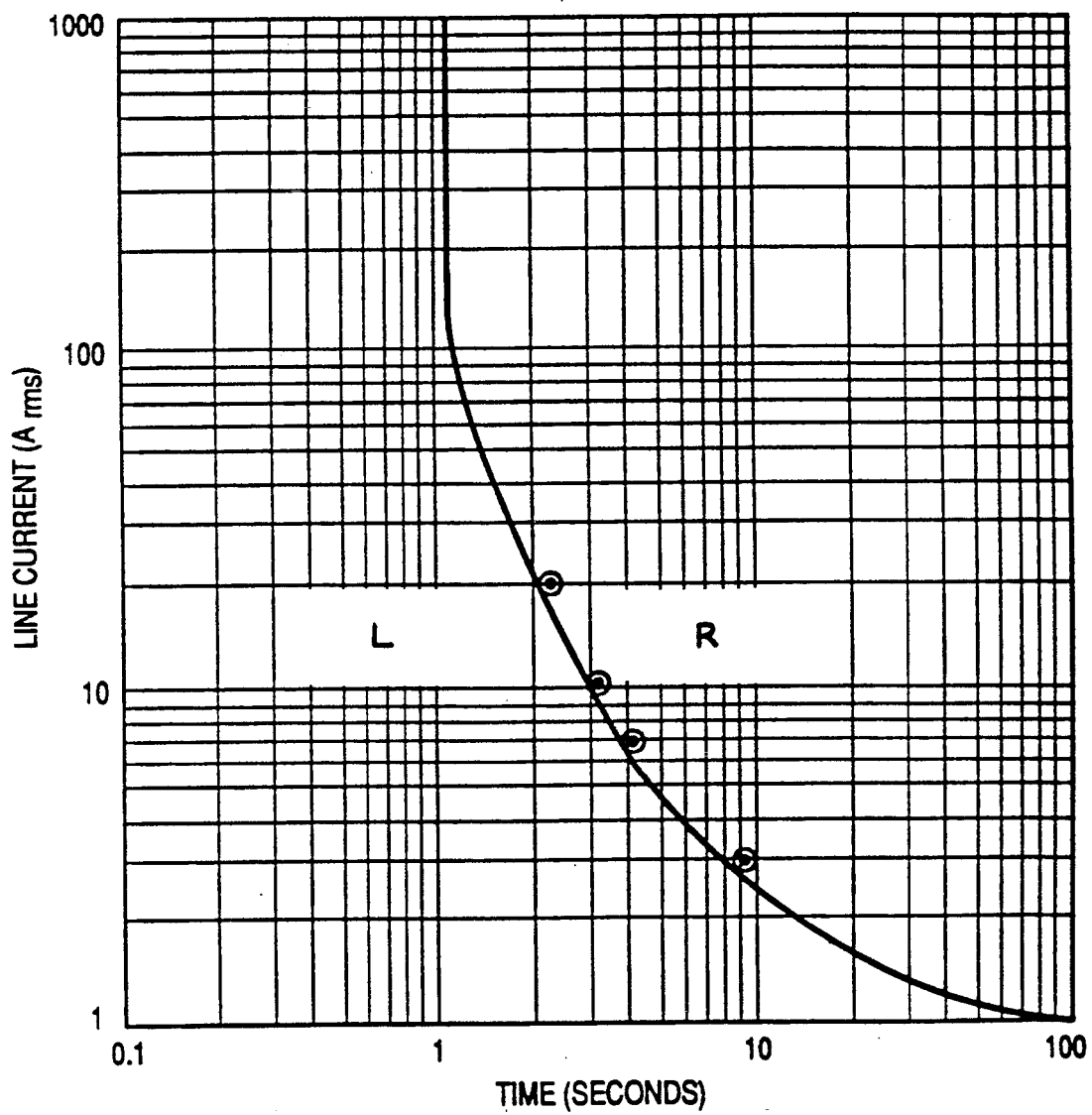
FIG. 5 is a graph illustrating the operation of the device in FIG. 1.

When the line is energized after an extended outage, mode 1, the faulted circuit indicators progress through an arming period during which they will not indicate fault. This period is designated as the "inrush restraint enabled time". It appears graphically in FIG. 5. FIG. 5 is a diagram of time versus current to disable in rush restraint after an extended outage. The portion L of the graph to the left of the curve illustrates the conditions when inrush restraint is enabled, and the portion R to the right of the curve illustrates the conditions when inrush restraint is disabled. Once the faulted circuit indicator operates to the right side of the curve, and the line current has dropped below the fault setting of the faulted circuit indicator, it is armed and ready to indicate fault occurrence provided a minimum operating current has been maintained.

Figure 6:
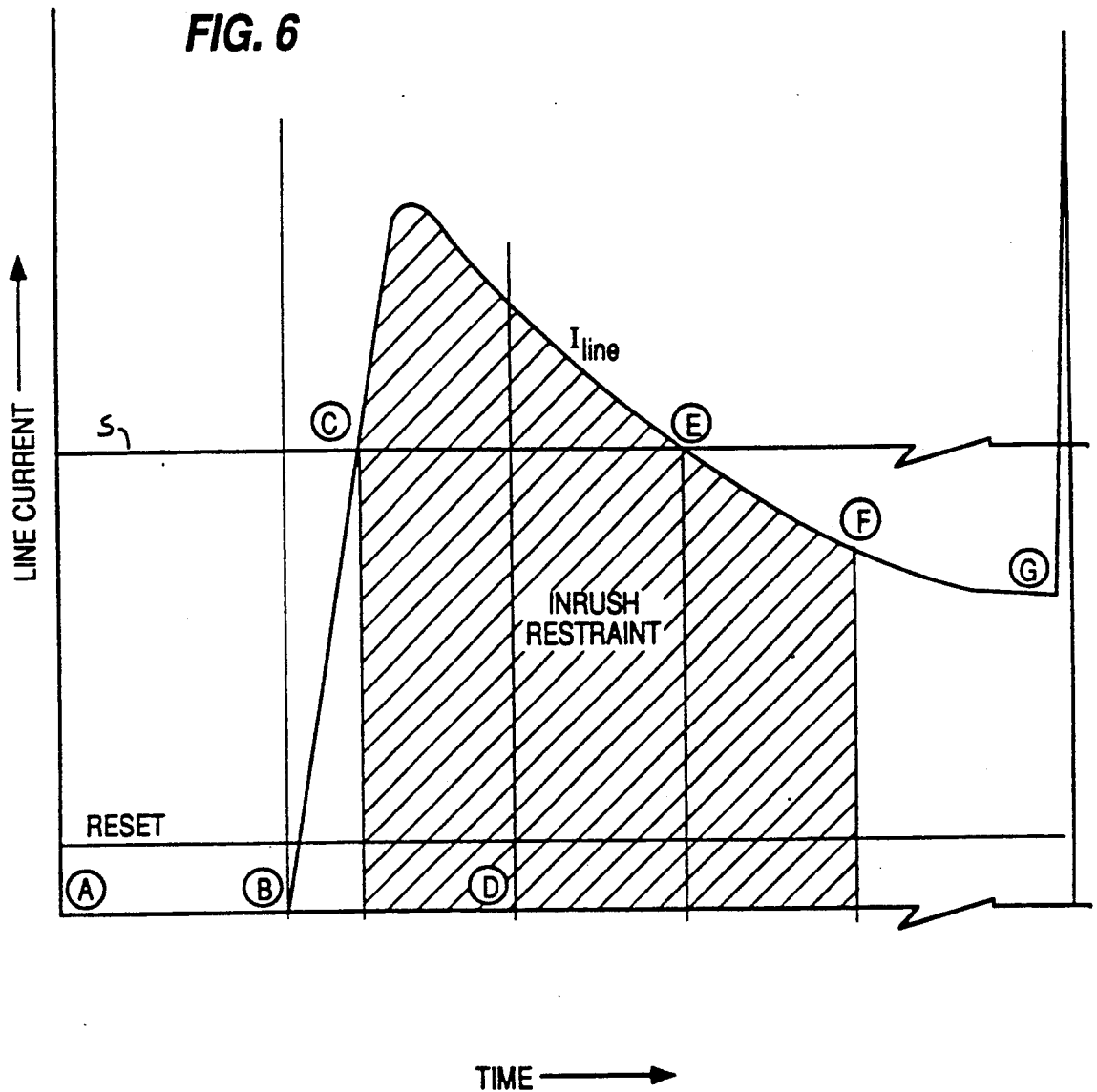
FIG. 6 is a graph illustrating the operation of the device in FIG. 1.

During reclosure, inrush restraint occurs when the faulted circuit indicator senses a drop in line current below a reset value or minimum value for at least 10 cycles, followed by an excursion of current above a fault setting within 10 cycles after closing. The 10 cycles are established by the sampling rate of the chip CH. This is shown in FIG. 6. FIG. 6 is a diagram showing the inrush restraint (reclosure operation). At time A the breaker opens and at time B breaker closes. At time C the inrush restraint activates. Time D is the end of a time interval, measured from point B, that the FCI uses to make a decision on the inrush current. Point E is the point at which the line current falls below the fault setting of the faulted current indicator.

Point F is the point at which the FCI is armed and ready to indicate a fault occurrence. A fault occurs at time G and the faulted current indicator operates to fault.

The interval between the Points A and B represents a 10 cycle minimum. The interval between B and D represents 10 cycles. The interval between E and F represents a one second maximum and the interval between C and F represents the time during which the FCI reads normal to the restraint. The shaded portion represents inrush restraint.

The discharge time of the 4.7 microfarad capacitor C7 causes the restraint period to last one second longer than the time it takes for the line current of drop below the fault setting of the faulted circuit indicator. Members D14 and R19 connect the capacitors C6 and C7. After the inrush period has elapsed the faulted circuit indicator is ready to operate to fault should high current occur.

Figure 7:
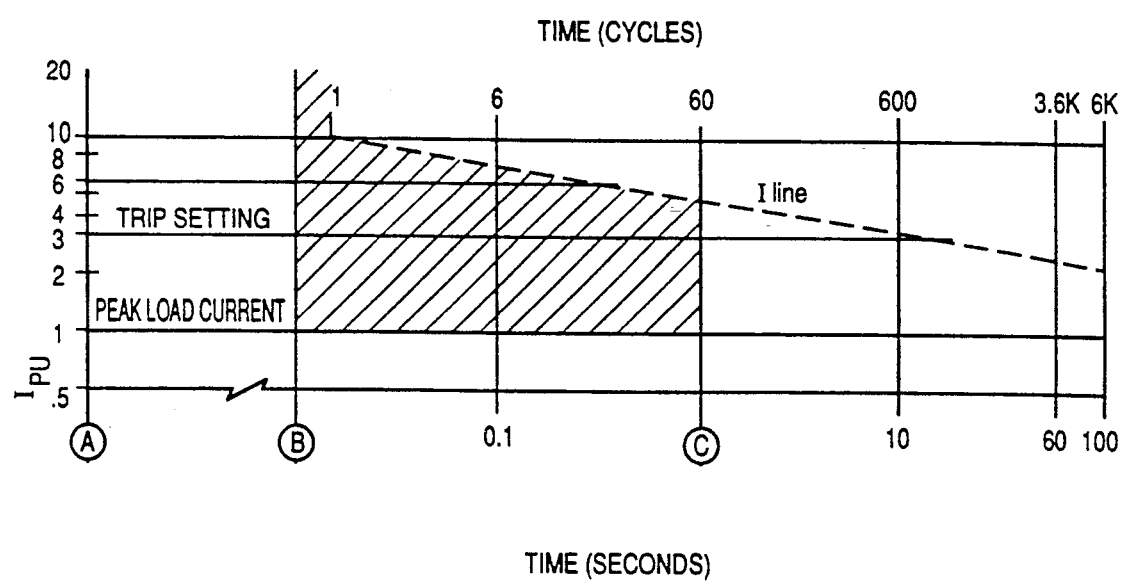
FIG. 7 is a graph illustrating the operation of the device in FIG. 1.

FIG. 7 illustrates the inrush restraint for outages greater than 90 seconds.

In FIG. 7, the ordinate represents peak load current. The upper abscissa indicates the time in cycles. The lower abscissa indicates the time in seconds. The interval from point A to point B is a 90 seconds minimum off time. The interval from time B to time C is the minimum inrush restraint time.

Energization inrush is the sum of the start-up currents required for charging the capacitive component of the cables, incandescent/fluorescent lamps, small appliance and large induction motors, distribution transformers, and all connected capacitor banks. The time required for the decay of this current towards normal is generally less than 15 cycles. (Motor loads are mentioned here if the outage time has been of a short duration, say, due to recloser operation.) The magnitude of energization current varies greatly. It depends on the diversity of equipment, the initial condition that each type of load is presenting to the source, the impedance upstream of each device, and the point on the voltage sine wave at which energization occurs. Inrush magnetizing currents of recent design distribution transformers have displayed current magnitudes 45 times greater than normal. Each of the above types of equipment have been well studied and individually are predictable, but when many of them are energized all at once, there is no way that anyone can predict the magnitude and duration of energization current. It is always changing due to the nature of the connected load, its location on the distribution circuit, its immediate history prior to energization, and a host of other factors. Estimates of peak energization inrush range from 6 to 25 times normal current but is probably less than 15 times normal load.

Since the trip speed of an FCI is very fast, a well designed FCI will almost always operate to indicate a fault during the energization current time. However, in some cases it may be desirable or necessary that the FCI not go to fault due to energization current. Since it is nearly impossible to predict the magnitude of this current, then the only certain way to prevent inrush tripping is to use inrush restraint that blocks FCI tripping for some period of time after circuit energization, say, 15 to 60 cycles.

Cold-load inrush is the sum of the currents of loads that take time before they reach normal current (such as motor loads) and the lack of diversity of thermostatically controlled loads (such as ovens and space heaters). Motor starting loads usually decay to normal in a matter of seconds (less than three seconds for small motors; less than ten seconds for large motors). Thermostatically controlled loads usually reach diversity equilibrium within 60 minutes after periods of power outage lasting over four hours. The cold-load current magnitudes are usually less than six times normal current of the connected load at the time of energization, decreasing to two times normal current within five minutes.

In view of the above, if an FCI setting is chosen to be 3 times peak load, then it will go to trip until the cold-load inrush decreases below the trip setting, usually 90% of trip, before it reverts back to a reset indication. If it is deemed desirable or necessary that the FCI not go to fault due to cold-load inrush currents, then a trip operate value of greater than six times peak load current should be chosen.

While embodiments of the invention have been described in detail it will be evident that the invention may be embodied otherwise.

What is claimed is:

1. A faulted circuit indicator, comprising:
   reset means responsive to a first current value in a cable for producing a reset signal;
   trip means responsive to a second current value in the cable for producing a trip signal;
   disabling means coupled to said reset means and said trip means for disabling said trip means in response to changes in current values in the cable from values below the first current value to values above the second current value within a predetermined period;
   said disabling means otherwise enabling said trip means for changes in current values in the cable from values above the first current value of said reset means to values above the second current value of said trip means within the predetermined period.

2. A faulted circuit indicator as in claim 1, wherein said disabling means establishes a first predetermined period when the current in the cable has remained below the first current value for a first time length and a second predetermined value when the current in the cable has remained below the first current value for a second time length substantially longer than the first time length.

3. A faulted circuit indicator; comprising:
   reset means responsive to a first current value in a cable for producing a reset signal;
   trip means responsive to a second current value in the cable for producing a trip signal;
   disabling means coupled to said reset means and said trip means for disabling said trip means in response to changes in current values in the cable from values below the first current value to values above the second current value within a predetermined period;
   said disabling means including a latch for latching said trip means in the disabled condition in response to a proportion of the voltage across the cable changing more rapidly than the voltage changes across a capacitor during the predetermined period.

4. An indicator as in claim 1, wherein:
   said disabling means includes a timing means for sampling values corresponding to the first and second current values for a given time period at predetermined repetition intervals each equal to the predetermined period.

5. A faulted circuit indicator, comprising:
   reset means responsive to a first current value in a cable for producing a reset signal;
   trip means responsive to a second current value in the cable for producing a trip signal;
   disabling means coupled to said reset means and said trip means for disabling said trip means in response to changes in current values in the cable from values below the first current value to values above the second current value within a predetermined period;
   said disabling means including a timing means for sampling values corresponding to the first and second current values for a given time period at predetermined repetition intervals each equal to the predetermined period; and
   the intervals being each equal substantially to 10 cycles of current to which said trip means and reset means respond.

6. An indicator as in claim 1, wherein:
   said trip means includes means for preventing operation of said reset means when said trip means produces a trip signal.

7. A faulted circuit indicator as in claim 1, wherein:
   said disabling means continues disabling said trip means after current in the cable exceeds the second current value of said trip means until after the current value in the cable falls below the second current value.

8. A faulted circuit indicator, comprising:
   reset means responsive to a first current value in a cable for producing a reset signal;
   trip means responsive to a second current value in the cable for producing a trip signal;
   disabling means coupled to said reset means and said trip means for disabling said trip means in response to changes in current values in the cable from values below the first current value to values above the second current value within a predetermined period;
   said disabling means continuing disabling of said trip means after the current in the cable exceeds the second current value of said trip means until after current value falls below the second current value.

9. A faulted circuit indicator, comprising:
   reset means responsive to a first current value in a cable for producing a reset signal;

trip means responsive to a second current value in the cable for producing a trip signal;

disabling means coupled to said reset means and said trip means for disabling said trip means in response to changes in current values in the cable from values below the first current value to values above the second current value within a predetermined period;

said disabling means enables said trip means for changes in current values in the cable from values above the first current value of said reset means to values above the second current value of said trip means within the predetermined period;

said disabling means continues disabling said trip means after the current in the cable exceeds the second current value of said trip means until after current value falls below the second current value.

* * * * *